United States Patent
Francis et al.

(10) Patent No.: US 9,506,504 B2
(45) Date of Patent: *Nov. 29, 2016

(54) LUBRICATION IN A TRANSFER CASE WITHOUT A MECHANICAL PUMP

(71) Applicant: BorgWarner Inc., Auburn Hills, MI (US)

(72) Inventors: Philip J. Francis, Lapeer, MI (US); Michael F. Boyer, Sterling Heights, MI (US); Garrett W. Gage, Metamora, MI (US); Johan Nilsson, Malmo (SE); Daniel Kampe, Oerkelljunga (SE)

(73) Assignee: BorgWarner Inc., Auburn Hills, MI (US)

(*) Notice: Subject to any disclaimer, the term of this patent is extended or adjusted under 35 U.S.C. 154(b) by 43 days.

This patent is subject to a terminal disclaimer.

(21) Appl. No.: 14/466,296

(22) Filed: Aug. 22, 2014

(65) Prior Publication Data

US 2015/0060228 A1    Mar. 5, 2015

Related U.S. Application Data

(60) Provisional application No. 61/870,482, filed on Aug. 27, 2013.

(51) Int. Cl.
    *F16D 13/74*      (2006.01)
    *F16D 25/12*      (2006.01)
    *F16H 57/04*      (2010.01)
    (Continued)

(52) U.S. Cl.
    CPC .............. *F16D 25/123* (2013.01); *B60K 17/35* (2013.01); *F16D 13/74* (2013.01); *F16H 57/045* (2013.01); *F16H 57/0421* (2013.01); *F16H 57/0473* (2013.01); *B60K 17/342* (2013.01); *B60K 23/0808* (2013.01); *F16D 2300/0214* (2013.01)

(58) Field of Classification Search
    CPC ..................... F16D 2300/0214; F16D 25/123; F16D 13/72; F16D 13/74; F16H 57/04–57/0498; B60K 17/00–17/36; B60K 23/00–2023/0891
    See application file for complete search history.

(56) References Cited

U.S. PATENT DOCUMENTS

| | | |
|---|---|---|
| 3,505,904 A | 4/1970 | Williams, Jr. |
| 3,601,515 A | 8/1971 | Pelizzoni |

(Continued)

FOREIGN PATENT DOCUMENTS

| | | |
|---|---|---|
| AT | 007 700 U1 | 7/2005 |
| DE | 3600871 | 7/1987 |

(Continued)

OTHER PUBLICATIONS

Machine translation of DE 102007057984 A1 downloaded from epo.org on Nov. 25, 2015.*

*Primary Examiner* — Richard Lorence
(74) *Attorney, Agent, or Firm* — Warn Partners, P.C.

(57) ABSTRACT

A transfer case is provided with a primary shaft which is selectively engagable with a secondary shaft via a clutch mechanism. The clutch mechanism is inclusive of a friction pack. A hub of the clutch mechanism is connected on the primary shaft and the clutch housing is torsionally fixed with a primary sprocket rotatively mounted on the primary shaft. A reservoir system is provided for delivering splashed oil axially along the primary shaft overlapping the friction pack. The reservoir system has a collective fluid receptacle that is connected via a stationary passage with a lubrication passage radially inward of the friction pack of the hub.

14 Claims, 8 Drawing Sheets

(51) Int. Cl.
  B60K 17/344 (2006.01)
  B60K 17/35 (2006.01)
  B60K 17/342 (2006.01)
  B60K 23/08 (2006.01)

(56) References Cited

U.S. PATENT DOCUMENTS

| | | | |
|---|---|---|---|
| 3,943,798 A | 3/1976 | Sato | |
| 4,086,826 A | 5/1978 | von Kaler | |
| 4,299,140 A | 11/1981 | Kako et al. | |
| 4,346,622 A | 8/1982 | Pierce | |
| 4,414,861 A | 11/1983 | Witt | |
| 4,422,349 A | 12/1983 | Matsumoto et al. | |
| 4,462,271 A | 7/1984 | Stieg | |
| 4,543,854 A | 10/1985 | Roth | |
| 4,549,447 A | 10/1985 | Sakakibara | |
| 4,573,373 A | 3/1986 | Shimizu et al. | |
| 4,699,249 A | 10/1987 | Fujiura et al. | |
| 4,841,803 A | 6/1989 | Hamano et al. | |
| 4,914,968 A | 4/1990 | Diermeier et al. | |
| 5,334,116 A | 8/1994 | Baxter, Jr. | |
| 5,456,129 A | 10/1995 | Tane et al. | |
| 5,667,036 A | 9/1997 | Mueller et al. | |
| 5,704,863 A | 1/1998 | Zalewski et al. | |
| 5,873,440 A | 2/1999 | Godfrey et al. | |
| 5,954,612 A | 9/1999 | Baxter, Jr. | |
| 6,516,789 B1 | 2/2003 | Jones | |
| 6,582,331 B1 | 6/2003 | Baxter, Jr. | |
| 7,252,616 B2 | 8/2007 | Wormsbaecher | |
| 7,713,158 B2 | 5/2010 | Gassmann et al. | |
| 7,753,173 B2 | 7/2010 | Gratzer et al. | |
| 7,841,449 B2 | 11/2010 | Nakamura et al. | |
| 7,984,791 B2 | 7/2011 | Taguchi et al. | |
| 8,650,980 B2 | 2/2014 | Lafer et al. | |
| 2001/0011616 A1 | 8/2001 | Kageyama et al. | |
| 2005/0101431 A1 | 5/2005 | Allen et al. | |
| 2006/0100053 A1* | 5/2006 | Asahi | F16H 57/0483 475/221 |
| 2009/0143182 A1 | 6/2009 | Thomas et al. | |
| 2009/0235781 A1 | 9/2009 | Quehenberger et al. | |
| 2010/0101351 A1* | 4/2010 | Lafer | B60K 17/344 74/467 |
| 2013/0190114 A1 | 7/2013 | Neumeister | |
| 2015/0240935 A1* | 8/2015 | Kampe | F16H 57/0409 474/91 |

FOREIGN PATENT DOCUMENTS

| | | | |
|---|---|---|---|
| DE | 19544322 | 6/1996 | |
| DE | 10116455 | 10/2001 | |
| DE | 102007057984 A1 * | 6/2009 | F16H 57/0447 |
| EP | 0477767 | 4/1992 | |
| EP | 0490548 | 6/1992 | |
| EP | 0268904 | 6/1998 | |
| FR | 2759132 | 8/1998 | |
| GB | 458379 | 9/1935 | |
| JP | 59-208265 | 11/1984 | |
| SU | 983361 | 12/1982 | |
| WO | 2004092639 | 10/2004 | |
| WO | 2005115790 | 12/2005 | |
| WO | 2006015394 | 2/2006 | |

* cited by examiner

LUBRICATION IN A TRANSFER CASE WITHOUT A MECHANICAL PUMP

CROSS-REFERENCE TO RELATED APPLICATIONS

This application claims the benefit of U.S. Provisional Application No. 61/870,482, filed Aug. 27, 2013.

FIELD OF THE INVENTION

The present invention relates to transfer cases for automotive vehicles. In particular, the field of the present invention is for transfer cases for automotive selective on demand four wheel drive vehicles with particular application for vehicles having normal rear wheel drive with longitudinally mounted engines.

BACKGROUND OF THE INVENTION

Most rear wheel drive vehicles which are selectively engagable to be all wheel drive vehicles have a transfer case. The transfer case typically has a primary shaft which is connected to the output of a vehicle transmission. The primary shaft typically rotatably mounts a sprocket which engages with a chain. The chain typically engages with another sprocket which is typically connected with a secondary shaft. The secondary shaft is rotatably mounted within the transfer case. The secondary shaft is torsionally connected with a front drive shaft which is torsionally connected with a front differential to power front wheels of the vehicle. To provide a function of selectively engaging the front wheels of the vehicle, typically there is a clutch mechanism which selectively engages the sprocket on the primary shaft with the primary shaft to transfer torque to the primary shaft to the secondary shaft thereby selectively engaging the front wheels of the vehicle. When ideal pavement conditions exist, typically the clutch will not be engaged so that the vehicle only engages the rear wheels of the vehicle. A controller is typically provided which is cognizant of wheel slip conditions to automatically control the engagement of the clutch. In some embodiments, the clutch can also be engaged as a result of operator demand.

Most transfer cases have some type of lubricant pump to provide lubrication for the clutch in its associated friction pack. The operation of this pump provides a load on the vehicle engine either mechanically by being powered by the take off from the vehicle drive train or is a load upon the engine indirectly by generating a parasitic electrical load. It is desirable to provide a transfer case wherein the lubrication needed for the friction pack of the clutch can be provided in large manner or in total passively from the operation of the transfer case. An example of such a transfer case is provided in U.S. Pat. No. 7,753,173 to Gratzer et al. It is desirable to provide a transfer case that is an alternate to Gratzer et al.

SUMMARY OF THE INVENTION

To meet the above noted desire and to provide other advantages, a revelation of the present invention is brought forth. The present invention provides a transfer case with a primary shaft which is selectively engagable with a secondary shaft via a clutch mechanism. The clutch mechanism is inclusive of a friction pack. A hub of the clutch mechanism is connected on the primary shaft and the clutch housing is torsionally fixed with a primary sprocket rotatively mounted on the primary shaft. A reservoir system is provided for delivering splashed oil axially along the primary shaft overlapping the friction pack. The reservoir system has a collective fluid receptacle that is connected via a stationary passage with a lubrication passage radially inward of the friction pack of the hub.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figures 1, 5:
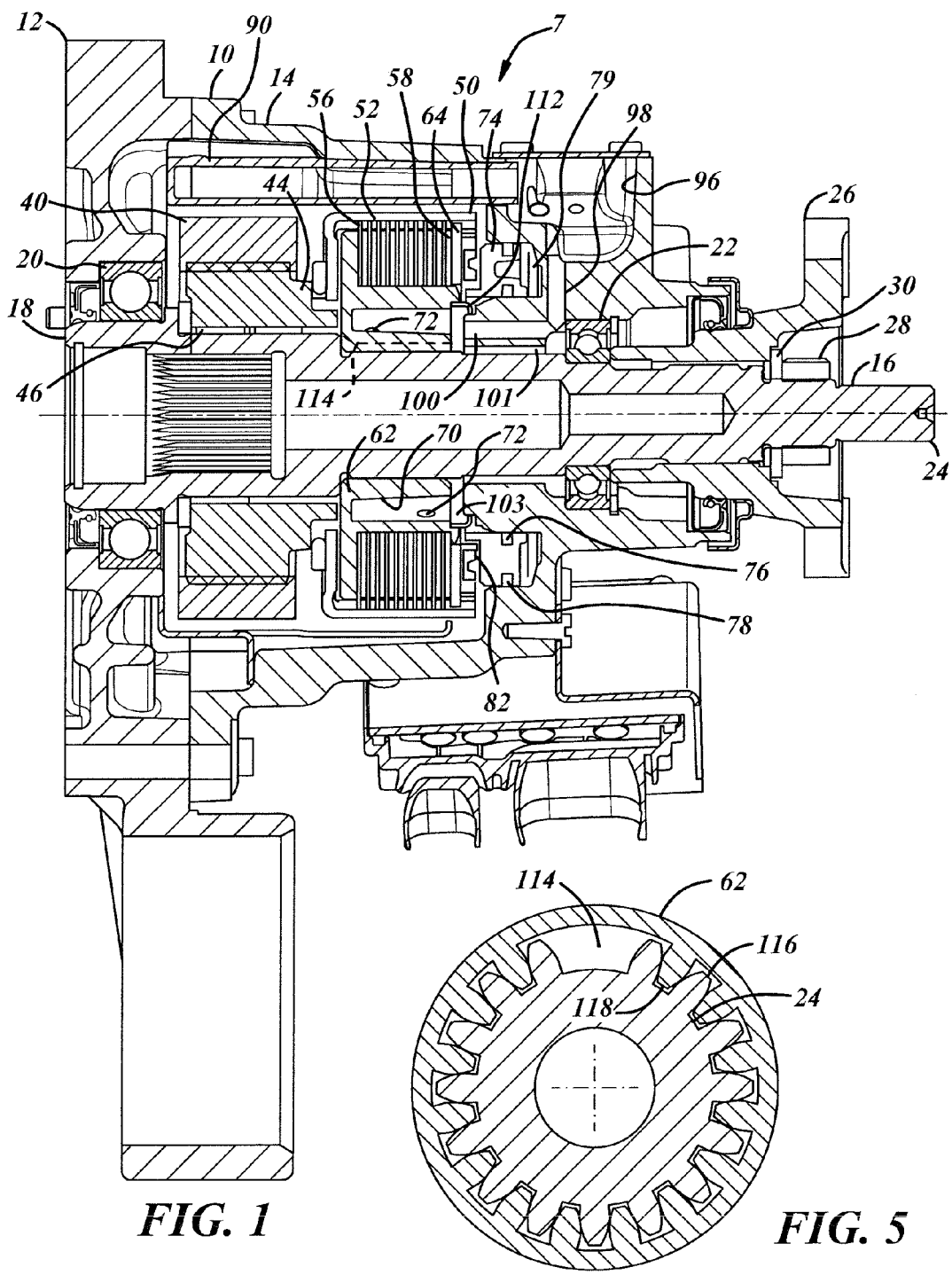
FIG. 1 is a sectional view of a preferred embodiment transfer case according to the present invention.
FIG. 5 is a partial sectional view illustrating a lubrication path extending between the hub and a primary shaft of the transfer case shown in FIGS. 1-4.
Figure 2:
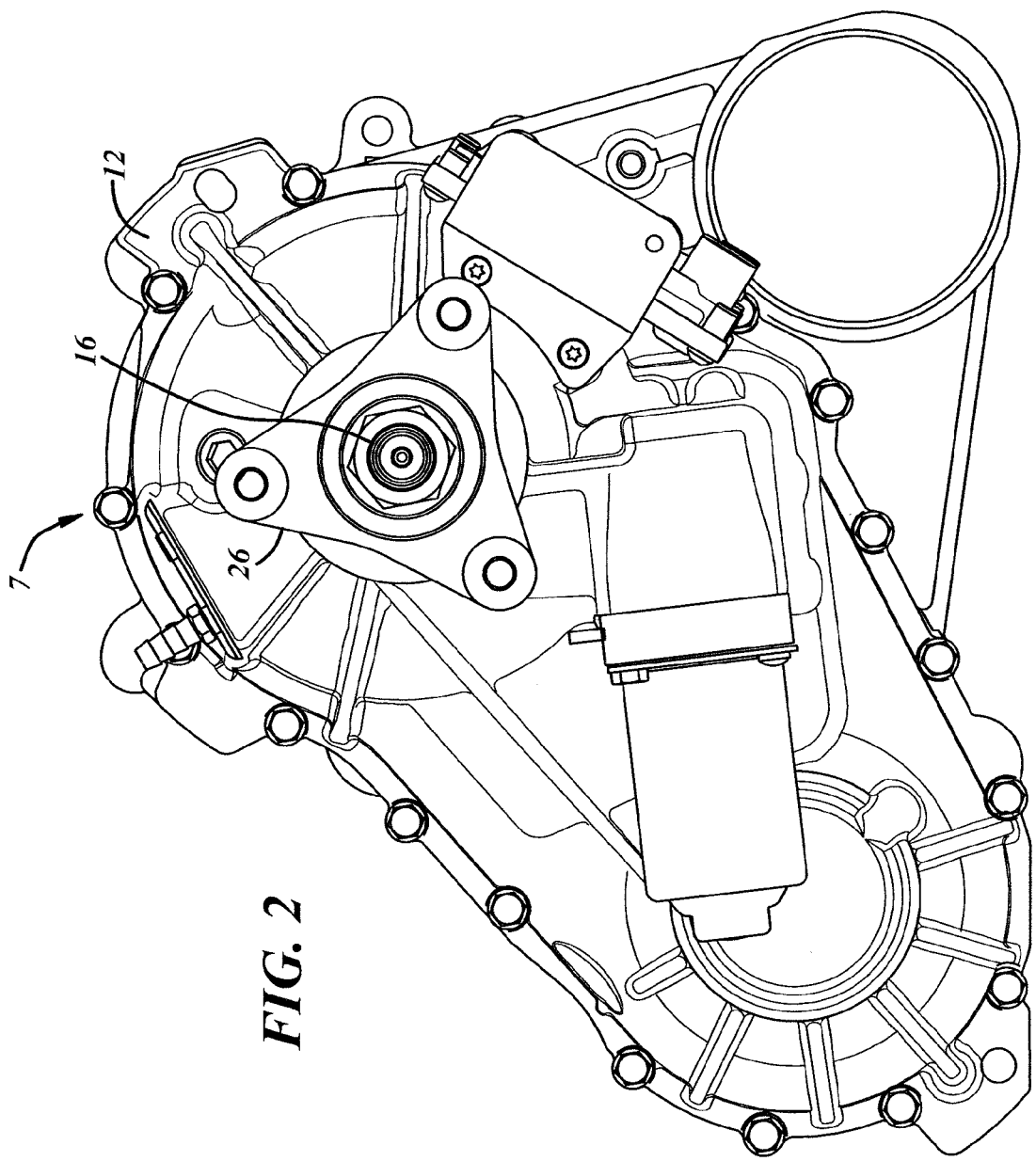
FIG. 2 is a rear elevational view of the transfer case shown in FIG. 1.
Figure 3:
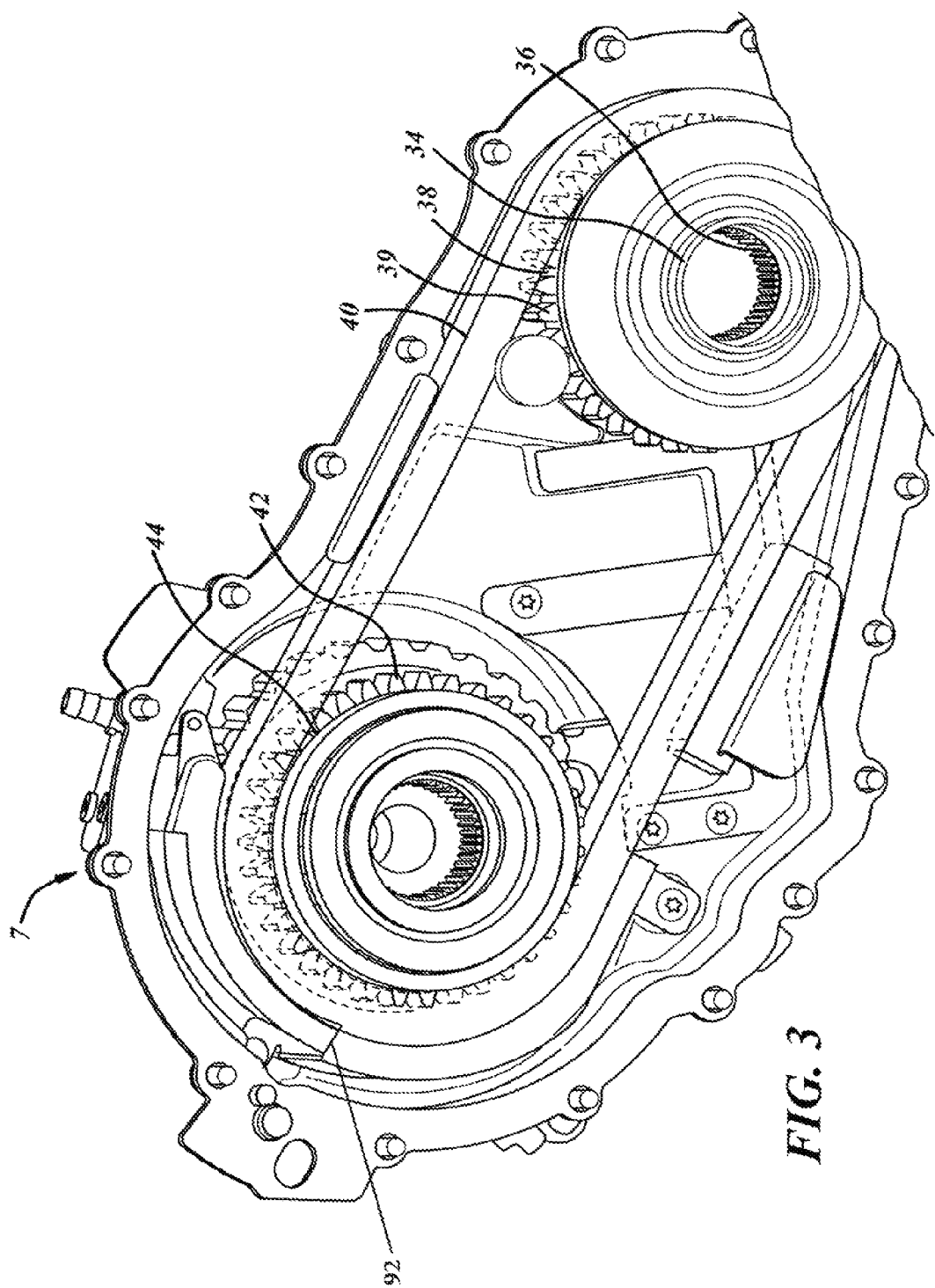
FIG. 3 is a front perspective view of the transfer case shown in FIGS. 1 and 2 with a front cover plate removed.
Figure 4:
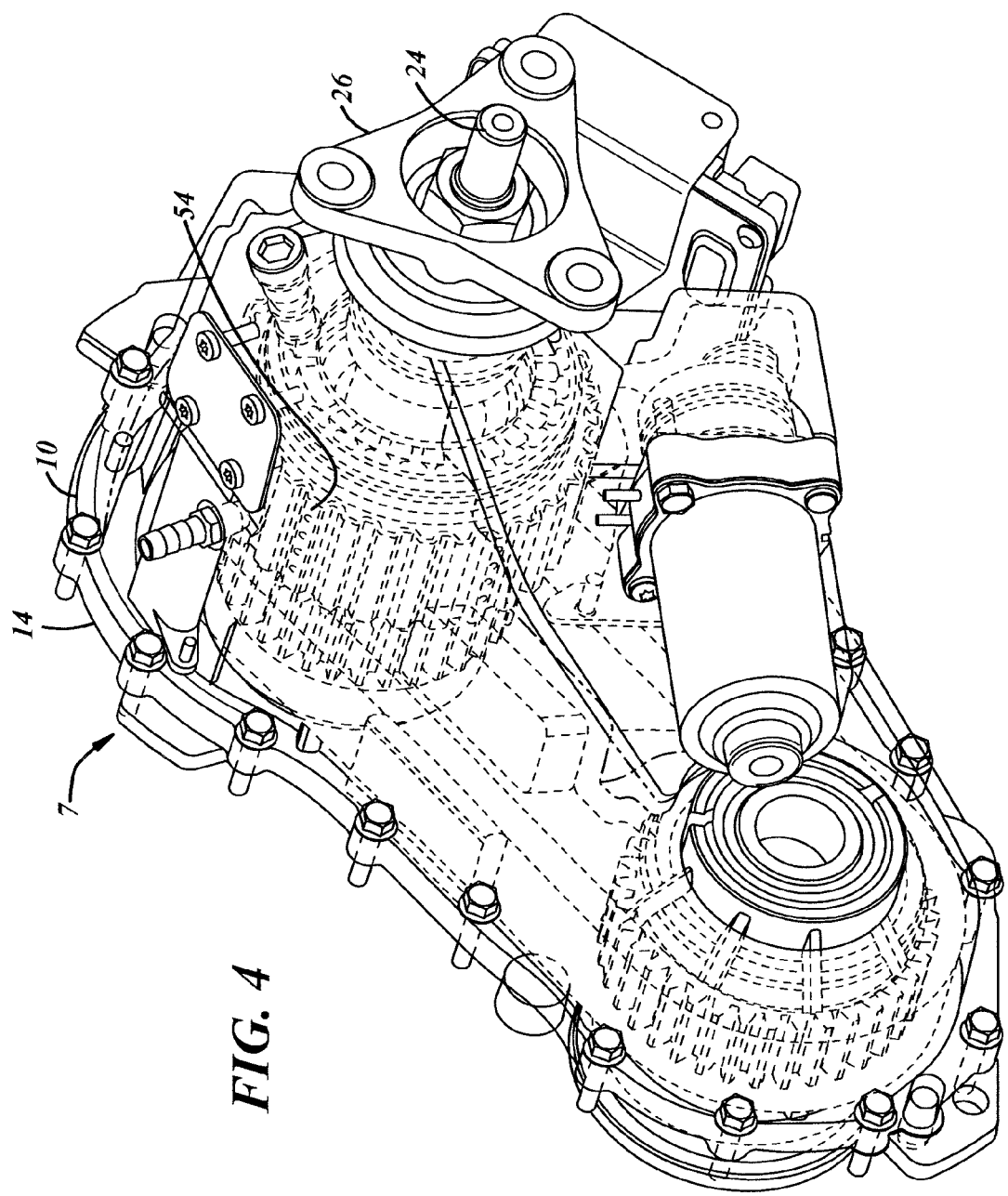
FIG. 4 is a rear perspective view with portions of the transfer case shown phantom in FIGS. 1-3.

Referring to FIGS. 1-5, a transfer case 7 according to the present invention is provided. The transfer case 7 has a housing 10. The housing 10 has a front cover plate 12 which is boltably connected to a main body 14. Rotatably mounted within the transfer case housing 10 is a primary shaft 16. The primary shaft 16 has a front end 18 conformed to connect with an output shaft (not shown) of a transmission of the vehicle. Typically, the vehicle will be a rear wheel drive vehicle with a longitudinally mounted engine. The drive train for the vehicle is configured in such a way that power can be selectively diverted from the rear axle to be shared with the front axle to provide the vehicle with all wheel drive capabilities. The primary shaft is mounted to the front cover plate 12 by a front bearing 20. A rearward portion of the main axle 16 is rotatably mounted within the housing main body 14 by a rear bearing 22. A rear end 24 of the primary shaft is connected with a yoke 26 by a nut 28 which captures a washer 30. The yoke 26 is connected with a drive line extending to a vehicle rear differential and axle (not shown).

At a lower elevation, the transfer case 7 also rotatably mounts a secondary shaft 34. The secondary shaft 34 is configured to have in its inner diameter splined teeth 36 to allow the secondary shaft 34 to power either directly or via a universal type joint, a front drive line shaft (not shown) that is torsionally connected with a differential for front wheels of the vehicle. An exterior of the secondary shaft is a connected sprocket 38 provided with a series of sprocket teeth 39. The sprocket teeth 39 engage a flexible torsional force transfer member or a belt 40 (shown schematically) which is typically provided by a multi-link chain. The belt 40 is engaged with sprocket teeth 42 provided on the engagement wheel or primary sprocket 44. The primary sprocket 44 is rotatably mounted on the primary shaft 16 by needle bearings 46. In other embodiments (not shown), the primary sprocket can instead be a gear in direct or indirect gear connection with the secondary shaft.

To allow the primary shaft 16 to selectively torsionally engage the secondary shaft 36, there is provided a clutch 50. The clutch 50 includes a clutch housing 52. The clutch housing 52 is torsionally fixably connected with the primary shaft sprocket 44. The clutch housing 52 has a series of radial folds 54 which provide radially inward projecting teeth which engage with correspondingly shaped radial edges of friction discs 56. The friction discs 56 are intermingled with corresponding friction plates 58. The friction plates 58 along their inner diameter have a gear tooth type profile to allow them to be torsionally connected with a hub 62 having radially outward corresponding folds. The hub 62 is torsionally affixed with the primary shaft 16 by weld, spline or shrink fit arrangement. A backing plate 64 is also provided. The backing plate 64, as well as friction plates 58 and friction discs 56, form a friction pack to allow for selective connection of the clutch housing 52 with the clutch hub 62 thereby causing the sprocket 44 to be joined with the primary shaft 16.

The hub 62 has a multiple series of lubrication axial extending passages 70. The axial passages 70 are intersected with radially outward projecting lubrication holes passages 72 which deliver lubricant to the friction pack. To selectively engage the friction pack, there is provided a piston 74. The piston 74 has a radially inner seal 76 and a radially outer seal 78. Axially behind the piston 74 is a pressurizable chamber 79 which is connected by a passage (not shown) with a source of pressurized fluid (not shown). When actuated, the piston 74 engages a bearing 82 which is adjacent to the backing plate 64 to engage this friction pack thereby torsionally connecting the hub 62 and primary shaft 16 with the sprocket 44, belt 40 and secondary shaft 34 to torsionally power the front wheels of the vehicle.

When the front wheels are engaged, there is need for lubricant to be delivered to the clutch pack. The lubricant may also add as a coolant. Lubricant is also delivered to the belt 40 and the sprockets 44 and to the secondary shaft 36.

As the chain moves, lubricant oil is splashed. Much of the oil is splashed into a reservoir system that includes collection baffle 90 having an entrance 92 generally adjacent the primary sprocket 44. The momentum of the lubricant oil causes the lubricant to be transported in an axial direction above the primary shaft 16 and above axially overlapping the piston 74 the clutch 50 and its associated friction pack. The lubricant is then collected in a collective fluid receptacle 96. The fluid receptacle 96 is formed in the body 14 of the housing. The fluid receptacle 96 is stationary and has an air bleed to allow for removal of entrapped air within the oil. The collection of oil develops a pressure head which enters a stationary housing vertical passage 98. The vertical passage 98 intersects with the rear bearing 22 to lubricate the same. Intersecting the vertical passage 98 is a stationary housing generally axial passage 100. Thus the flow of oil is additionally radially inward of the friction pack. Axial passage 100 allows the oil under the pressure heads supplied by the reservoir to travel axially in a generally forward direction flow into an axial extending lubricant passage 70 provided in the hub. One factor which enhances the performance of the lubrication provided by the present invention is that when the lubricant is being transported vertically inward through passage 98 there are no rotating member which it must pass. Oil entering the axial lubrication passage 70, then through rotation, the oil is urged radially outward through lubrication holes 72 to lubricate the friction pack.

Radially inward of the lubrication passage 100 is an inner lubrication passage 101. Inner lubrication passage 101 intersects with a disc shaped space 103. The disc shaped space 103 is bordered by a seal 112 which prevents lubrication oil from being pushed towards to piston 74. The primary shaft 24 is splined to the hub 62 by a series of radially outward extending teeth 116 interacting with radially inward extending teeth 118 of the hub. One or more of the teeth 116 or 118 are deleted to provide a lubrication passage 114 which extends between the interface of the hub and a primary shaft allowing lubricant to flow from the rear of the hub to the front of the hub and thereby reach needle bearings 46 which rotatively mount the primary sprocket 44 to the primary shaft.

Figure 6:
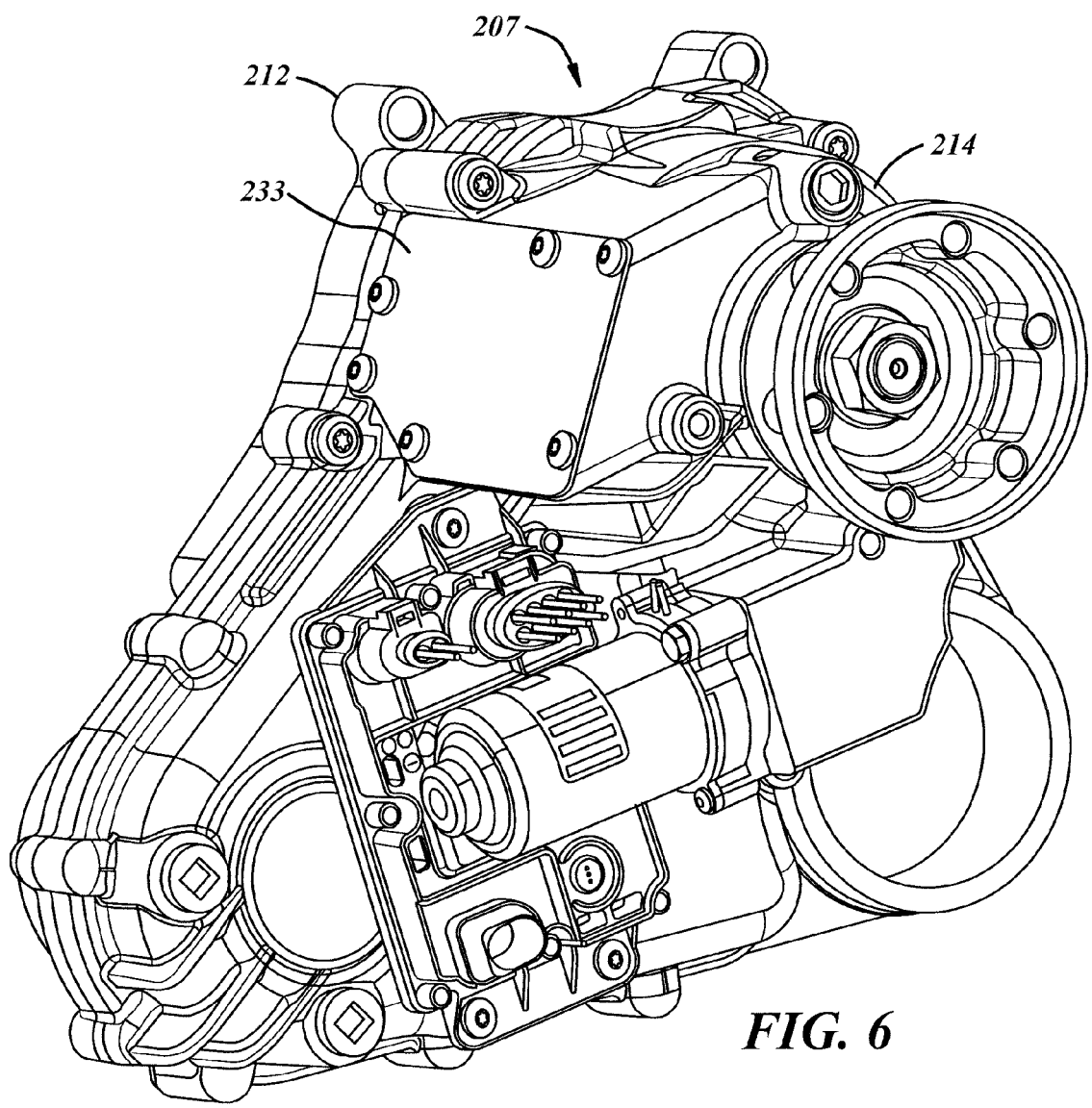
FIG. 6 is rear perspective view of an alternative preferred embodiment transfer case according to the present invention.
Figure 7:
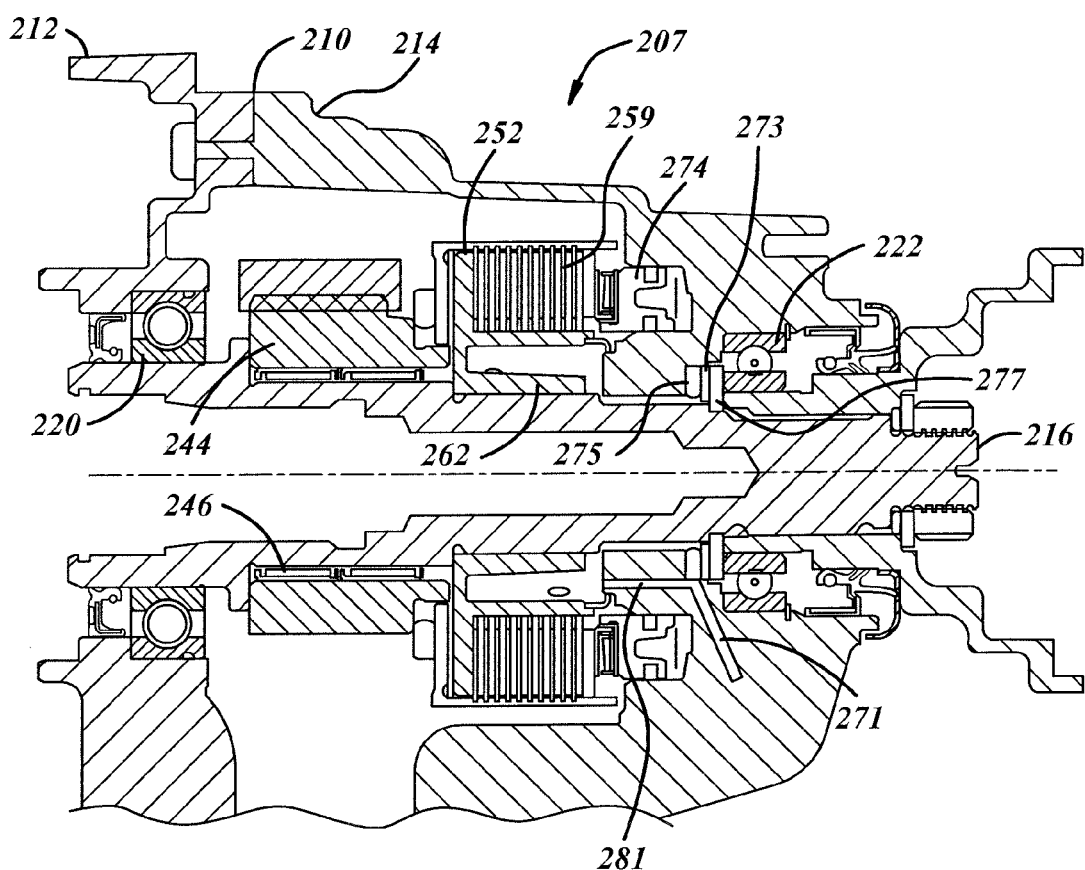
FIG. 7 is an enlarged partial side sectional view of the transfer case shown in FIG. 6.
Figure 8:
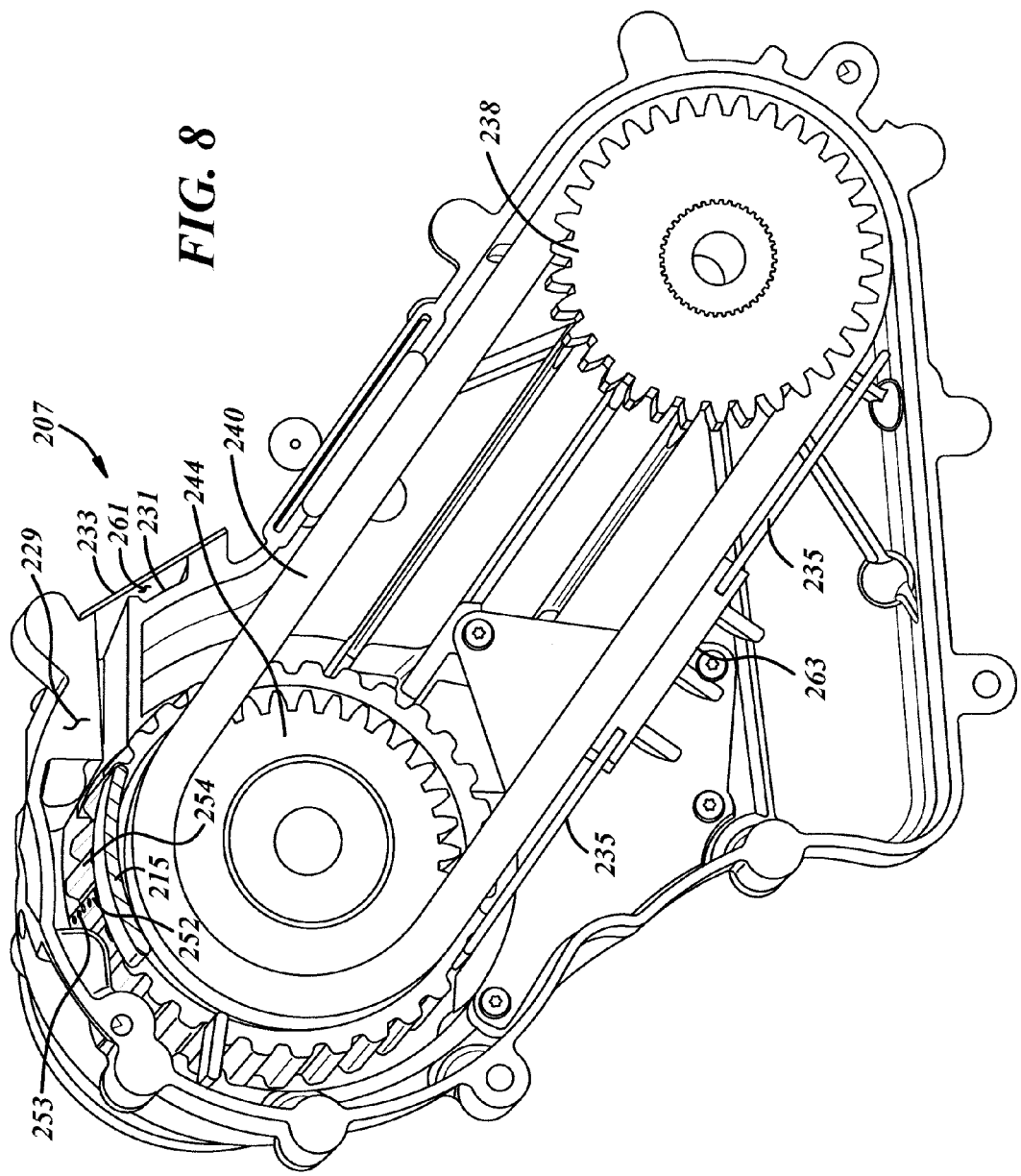
FIG. 8 is a side sectional perspective view of the transfer case shown in FIG. 6 with most of the front cover removed for illustration.
Figure 9:
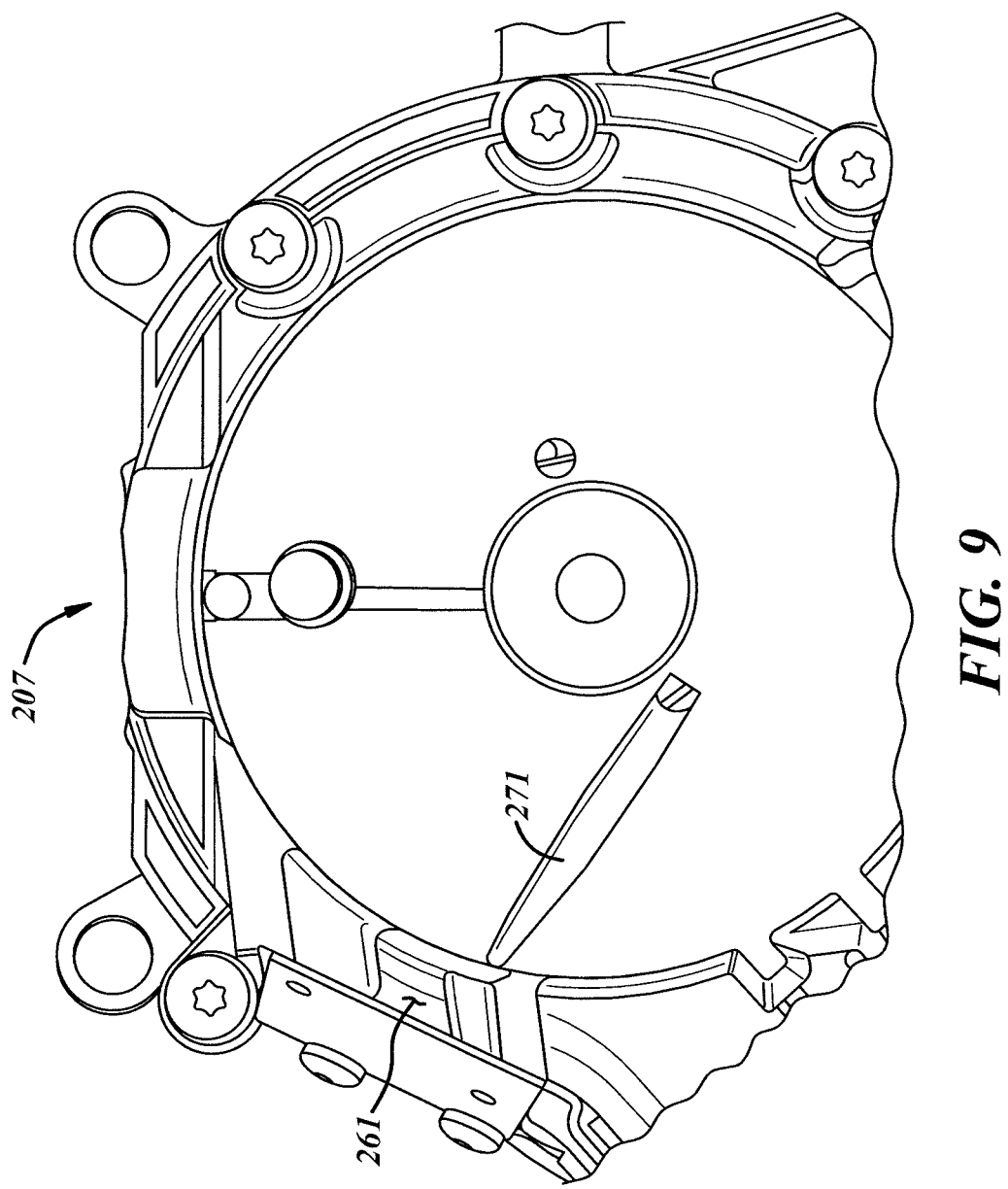
FIG. 9 is another partial side sectional perspective view of the transfer case shown in FIG. 6.

Referring to FIGS. 6-9, an alternative preferred embodiment transfer case 207 according to the present invention is provided. The transfer case 207 has a housing 210 with a front cover 212 and a main body 214. Transfer case 207 has a primary shaft 216 rotatively mounted to the front cover plate 212 by a front bearing 220. Spline connected to the primary shaft 216 is a hub 262 that is connected to the primary shaft 216 in a manner as previously described and also having an axial extending lubrication passage and is interfaced with the primary shaft 216 as previously described having a lubrication passage similar to passage 114.

Rotatably mounted on the primary shaft 216 by needle bearings 246 is a primary sprocket 244. Primary sprocket 244 is fixably connected with a clutch housing 252. The clutch housing 252 can be selectively engaged with the primary shaft 216 and hub 262 in a manner as previously described by virtue of a friction pack which can be selectively engaged by a piston 274. The front plate cover 212 has connected thereto a baffle 215. The baffle 215 is positioned generally adjacent to a chain 240 which transmits torque between a primary sprocket 244 and a secondary sprocket 238. Transfer case 207 also has a lower slack adjuster 263 which has extending there from two lubricant retainers 235. The lubricant retainers 235 function to help retain lubricant within the chain 240 as the chain 240 moves from the lower secondary sprocket 238 to the primary sprocket 244. The lubricant in normal usage is pooled in the bottom of the housing 210. The clutch housing 252 also has a series of axially spaced holes 253 to allow for the escape of lubricant in the friction pack beyond the clutch housing. The holes 253 are typically be on top of the radial folds 254 of the clutch housing.

As the chain 240 rotates, oil escapes the chain 240 and is diverted by baffle 215 an adjacent entrance of the reservoir system 229. Oil also escapes the holes 253 and goes to the reservoir system 229. A collective fluid receptacle 261 is formed by the housing 214 on an exterior side 231 of the housing opposite an interior side exposed to the clutch housing 252. A cover for the fluid receptacle 261 is provided by a plate 233. The plate 233 is connected and exposed to the exterior side 231 of the housing. The fluid receptacle 261 is intercepted by a stationary fluid passage 271 which is vertically reclined. The stationary passage 271 brings lubrication oil to an area adjacent the bottom half of the primary shaft 216 to lubricate the rear bearing 222 and an axial needle bearing 273. The axial needle bearing 273 is adjacent to thrust washers 275 and 277 which allow the housing to absorb the axial force caused by engagement of the clutch provided by the clutch housing 252 and the hub 262. The lubrication passage 271 is intersected by a generally axial lubrication passage 281 which then brings oil under pressure from the hydraulic head established in the collective receptacle 261 to the hub and needle bearings 246 generally as previously described. One of the vital features of transfer case 207 is that oil will circulate through the transfer case regardless of whether or not the hub is engaged with the clutch housing 252 by virtue of the friction pack 259.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle transfer case comprising:
a housing;
a primary shaft rotatably mounted within said housing;
a secondary shaft selectively driven by said primary shaft, said secondary shaft being rotatably mounted by said housing;
a hub torsionally fixed with said primary shaft;
a clutch housing selectively torsionally connected with said hub via a friction pack, said clutch housing having a series of holes to allow radial escape of lubricant;
an engagement wheel torsionally fixed with respect to said clutch housing and torsionally connected with said secondary shaft via a flexible torsional force member;
a friction pack engager to cause said clutch housing to be selectively connected with said hub; and
a reservoir system fixed with respect to said housing for capturing splashed lubricant energized by result of operation of said flexible torsional force member and of said clutch housing, said reservoir system having a portion adjacent to said engagement wheel and said reservoir system channeling said lubricant in an axial direction overlapping said friction pack and delivering the lubricant to a collective fluid receptacle, and said reservoir system having a stationary passage formed in said housing for transporting lubricant from said reservoir system to said primary shaft radially inward of said friction pack.

2. A transfer case as described in claim 1 wherein said hub has a lubricant passage underneath said friction pack.

3. A transfer case as described in claim 2 wherein said hub lubricant passage is intersecting with radial holes intersecting with a surface of said hub engaged with said friction pack.

4. A transfer case as described in claim 1 wherein said stationary passage in said housing also intersects with a bearing mounting said primary shaft with said housing.

5. A transfer case as described in claim 1 wherein said friction pack engager includes a hydraulically actuated piston.

6. A transfer case as described in claim 1 wherein said stationary passage from said collective fluid receptacle extends radially inward of said clutch pack engager.

7. A transfer case as described in claim 1 wherein said reservoir system includes a baffle formed by said housing to deflect lubricant to said collective fluid receptacle of said reservoir system.

8. A transfer case as described in claim 1 wherein said collective fluid receptacle of said reservoir system is formed by said housing on an exterior side of said housing opposite an interior side of housing exposed to said engagement wheel.

9. A transfer case as described in claim 1 wherein said collective fluid receptacle is formed on an exterior side of said housing opposite an interior side of said housing exposed to said engagement wheel and wherein said collective fluid receptacle is further bordered by a plate connected to said housing and exposed to said exterior side of said housing.

10. A transfer case as described in claim 1 wherein said transfer case has a liner to retain lubricant within said torsional force transferring member as said torsional force transferring member travels between said secondary shaft and said primary shaft.

11. A transfer case as described in claim 1 further having a lubricant passage formed between said primary shaft and said hub to provide a passage for lubricant to lubricate bearings mounting said engagement wheel on said primary shaft.

12. A vehicle transfer case for a normally rear wheel drive vehicle, said transfer case comprising:
a housing having a rear body and a front face plate;
a primary shaft rotatably mounted in said housing;
a secondary shaft for powering a front differential of a vehicle, said secondary shaft being selectively driven by said primary shaft and being rotatably mounted within said housing;
a hub torsionally affixed with said primary shaft, said hub having an axially extending lubrication passage intersected by generally radial lubrication holes;
a clutch housing selectively torsionally connected with said hub via a friction pack, said clutch housing having a series of holes to allow radial escape of lubricant;
a primary sprocket rotatably mounted upon said primary shaft and torsionally fixed with said clutch housing, said sprocket being engaged with a chain;
a hydraulically actuated piston for engaging said friction pack connecting said clutch housing with said hub;
a reservoir system fixed with respect to said housing for capturing splashed lubricant energized resulting of operation of said chain and clutch housing, said reservoir system having a baffle formed by said housing adjacent to said chain channeling lubricant to a collective fluid receptacle formed by said housing and axially overlapping said friction pack and said hydraulic piston and said reservoir system having a stationary passage formed in said housing for delivering lubricant from said collective fluid receptacle radially inward of said friction pack to said hub lubricant passage, said stationary passage having a generally vertical portion and intersecting horizontal portion and said stationary passage also being exposed to a bearing mounting said primary shaft.

13. A vehicle transfer case for a normally rear wheel drive vehicle, said transfer case comprising:
a housing having a rear body and a front face plate;
a primary shaft rotatably mounted in said housing;
a secondary shaft for powering a front differential of a vehicle, said secondary shaft being selectively driven by said primary shaft and being rotatably mounted within said housing;
a hub torsionally affixed with said primary shaft, said hub having an axially extending lubrication passage intersected by generally radial lubrication holes, said hub being splined to said primary shaft and said hub having an inner lubrication passage between said hub and said primary shaft to allow lubrication to flow from a rear end of said hub to a forward end of said hub;

a clutch housing selectively torsionally connected with said hub via a friction pack, said clutch housing having a series of holes to allow escape of lubricant radially outward;

a primary sprocket rotatably mounted upon said primary shaft and torsionally fixed with said clutch housing, said sprocket being engaged with a chain torsionally connecting said primary sprocket with said secondary shaft, said primary sprocket being rotatably mounted upon bearings, said bearings being lubricated by lubricant flowing between said hub and said primary shaft;

a hydraulically actuated piston for engaging said friction pack connecting said clutch housing with said hub;

a reservoir system fixed with respect to said housing for capturing splashed lubricant energized resulting of the operation of said chain and clutch housing, said reservoir system having a baffle formed by said housing adjacent to said chain channeling lubricant to a collective fluid receptacle formed by said housing and axially overlapping said friction pack and said hydraulic piston, said collective fluid receptacle being on an exterior side of said housing generally opposite of an interior side of said housing exposed to said primary sprocket; and a stationary passage formed in said housing for delivering lubricant from said collective fluid receptacle radially inward of said friction pack to said hub axially extending lubricant passage, said stationary passage having a generally vertically inclined portion intersecting a generally horizontal portion and said stationary passage also being exposed to a rear bearing mounting said primary shaft within said housing.

14. A vehicle transfer case comprising:

a housing;

a primary shaft rotatably mounted within said housing;

a secondary shaft selectively driven by said primary shaft, said secondary shaft being rotatably mounted by said housing;

a hub torsionally fixed with said primary shaft;

a clutch housing selectively torsionally connected with said hub via a friction pack;

an engagement wheel torsionally fixed with respect to said clutch housing and torsionally connected with said secondary shaft via a flexible torsional force member;

a friction pack engager to cause said clutch housing to be selectively connected with said hub; and a reservoir system fixed with respect to said housing for capturing splashed lubricant energized by result of operation of at least one of said primary and secondary shafts, said reservoir system having a portion adjacent to said engagement wheel and said reservoir system channeling said lubricant in an axial direction overlapping said friction pack and delivering the lubricant to a collective fluid receptacle, and said reservoir system having a stationary passage formed in said housing for transporting lubricant from said reservoir system to said primary shaft radially inward of said friction pack, and wherein said collective fluid receptacle of said reservoir system is formed by said housing on an exterior side of said housing opposite an interior side of said housing exposed to said engagement wheel.

* * * * *